May 22, 1962  W. J. GILBERT, SR  3,035,842
CARTRIDGE PRESSURE SHAFT SEAL
Filed April 4, 1957  3 Sheets-Sheet 1

INVENTOR.
WALTER J. GILBERT, SR.
BY
HIS ATTORNEY

May 22, 1962 W. J. GILBERT, SR 3,035,842
CARTRIDGE PRESSURE SHAFT SEAL
Filed April 4, 1957 3 Sheets-Sheet 2

INVENTOR.
WALTER J. GILBERT, SR.
BY
HIS ATTORNEY

May 22, 1962  W. J. GILBERT, SR  3,035,842
CARTRIDGE PRESSURE SHAFT SEAL

Filed April 4, 1957  3 Sheets-Sheet 3

INVENTOR.
WALTER J. GILBERT, SR.
BY
HIS ATTORNEY

United States Patent Office 3,035,842
Patented May 22, 1962

3,035,842
CARTRIDGE PRESSURE SHAFT SEAL
Walter J. Gilbert, Sr., Indiana, Pa., assignor to Syntron Company, Homer City, Pa., a corporation of Delaware
Filed Apr. 4, 1957, Ser. No. 650,703
11 Claims. (Cl. 277—92)

This invention relates generally to seals for propeller shafts on ships and more particularly to a shaft seal that can withstand sudden high pressures without breaking down.

When the propeller shaft of a ship is subjected to sudden high pressures such as produced by depth charges and mines the seal members, which ordinarily are light flexible elastomer flanges, rupture and cause leaks around the shaft.

The object of the present invention is the provision of a seal that will not rupture when subjected to sudden high pressures. To provide this advantage in a seal the elastomer is employed to seal on the shaft and against an antifriction material sealing ring which in turn forms the sealing surface with a mating sealing surface on a metal housing surrounding the shaft. This permits the elastomer to be backed up by a metal member. Under such conditions the structure can stand very high pressures. Two elastomers each with one flange adjacent one end of its shaft sealing body section may be employed with an expander therebetween or a single elastomer with a flange at each end of its shaft sealing body section may be used. In the latter structure the flanges are shaped so that when mounted they are flexed and deformed to force the antifriction and metal rings into sealing engagement.

Another object is the provision of a seal for a propeller shaft in a ship that can withstand sudden high pressures by reason of the fact that the body of each of the parts making up the seal adjacent the shaft is solid and substantially fills the seal chamber from end to end with the exception of small clearance specifically provided for the purposes of deformation of the seal member during periods of high pressures.

Another object is the provision of a propeller shaft seal capable of withstanding sudden high pressures which comprises a housing having seal surfaces of marine bronze coacting with seal surfaces on rings of antifriction material such as carbon or the like and separated by an elastomer which embraces and seals on the shaft and maintains the sealing surfaces in contacting engagement.

Other objects and advantages appear hereinafter in the following description and claims.

The accompanying drawings show for the purpose of exemplification without limiting the invention or claims thereto certain practical embodiments of the invention wherein the sectional view shows the seal as applied to the stern tube bearing housing of a submarine boat.

Figure 1:
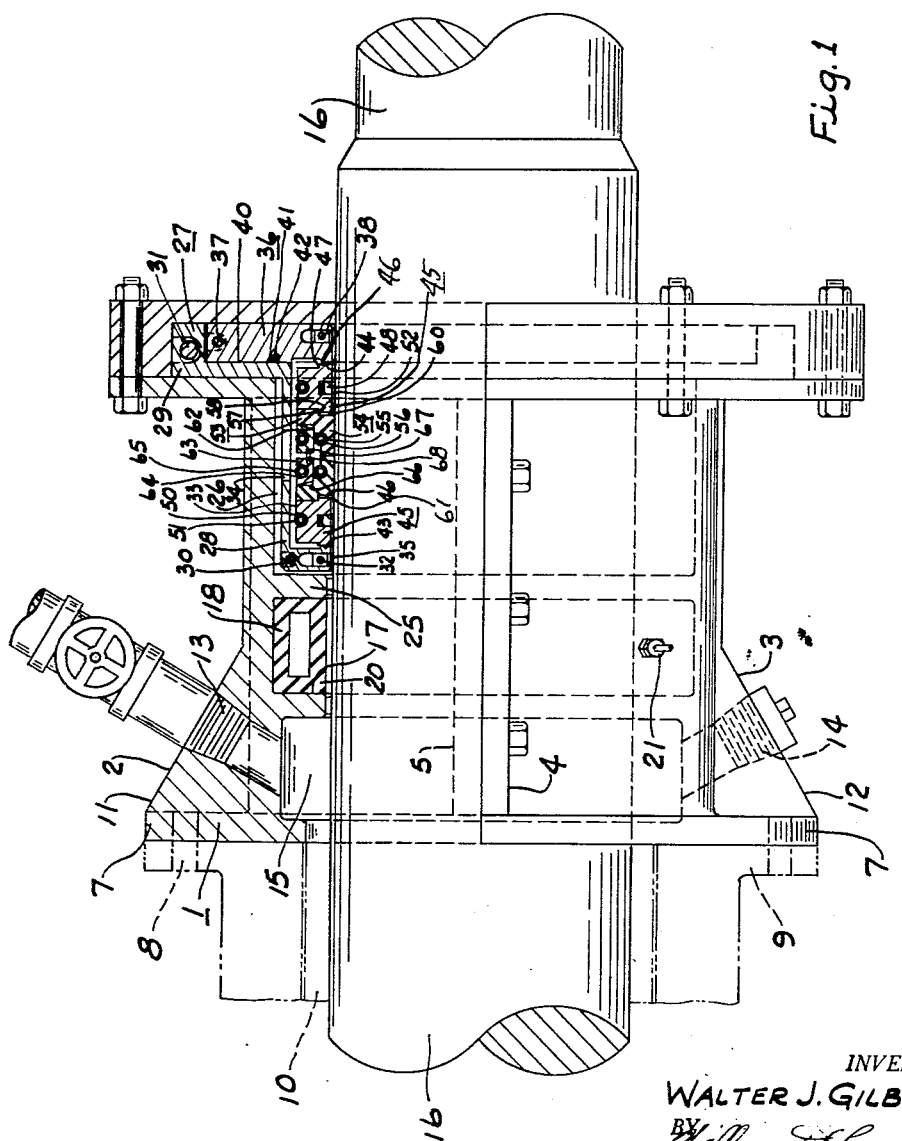
FIG. 1 is a sectional view of the seal comprising this invention as applied to the propeller shaft of a ship.
Figure 2:
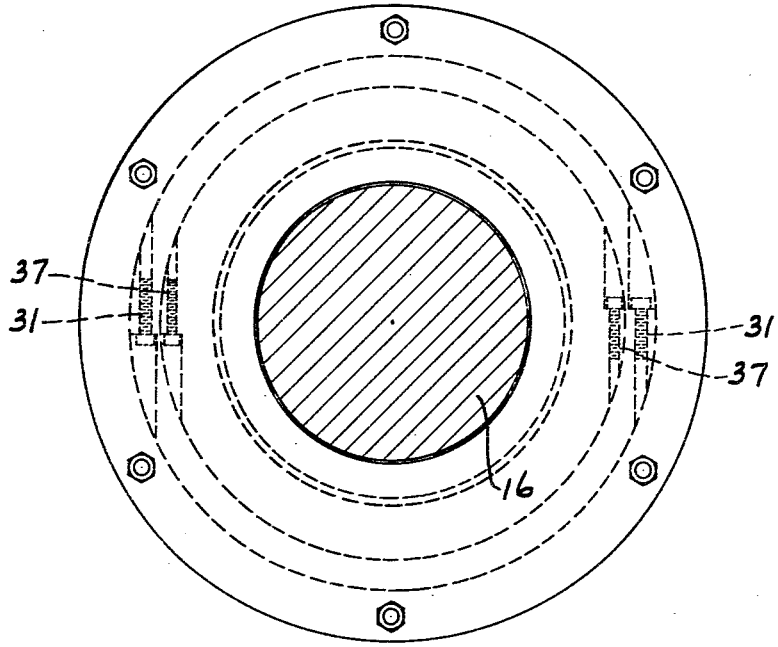
FIG. 2 is a view of the right end of the structure shown in FIG. 1 with the shaft in section.

Referring to the drawings, the split housing 1 is made in upper and lower halves 2 and 3, being split along the horizontal plane and having the radial flanges 4 and 5 which when bolted together form the completed housing as shown in FIG. 1.

The end of the housing is provided with the flange halves 7 which form an annular flange having a series of holes 8 passing therethrough for securing the housing to the hull of a ship or to the end of the bearing housing 9, enclosing the tail shaft bearing 10 as shown in FIG. 1. The flange 7 is backed up by the upper and lower angular brace members 11 and 12 which are each provided with threaded openings 13 and 14 that open into the interior chamber 15 of the split housing that surrounds the propeller shaft 16. The upper threaded opening 13 is supplied with water or clean sea water under predetermined pressure controlled by a valve for lubricating the tail shaft bearing 10 that produces positive and continued flow out through the tail shaft bearing and the stern tube of the ship. This functions to keep the bearing clean. Fresh water or water having been treated to remove any foreign substances or suspended substances in this tail bearing sea water provides longer life for the bearing and shaft. The lower opening 14 is used as a drain or blowout for the chamber 15.

The halves of the split housing 1 form an annular recess 17 for receiving the inflatable standby sealing member 18 which is made in two halves 20 and which are entirely independent of each other. Each expandable seal half has two valve stem mounting members 21, the stems of which support these seals in their respective housing half and maintain spaced relation between their inner arcuate surfaces and the shaft.

Each standby seal section is hollow for receiving fluid under pressure, such as water, oil, gas or air that may be inserted through one of the valve stems 21 to expand the seal members into sealing relation with the sides of the recess 17 and with each other and with the shaft 16. When this seal is expanded by inflation against the shaft and housing the shaft may be rotated in contact with the seal. By supplying a light pressure on the shaft and permitting a flow of clean liquid between the seal and the shaft, the same may be lubricated and will last for a long period of time, enough to bring a ship back to port.

The partition wall 25 separates the expandable seal recess 17 from the seal chamber 26 which bodily receives the seal member 27 that comprises an outer housing having a cylindrical section 28 and a flange member 29 formed integral therewith. The housing 27 is split vertically just off the plane shown and is fastened at its inner end by the bolts 30 and at its outer end by the bolts 31. A key 32 is provided to insure alignment of the two halves when they come together. The housing is provided with an inner chamber 33 that is opened through the passage 34 to the outer chamber 26 and the bore of the housing is spaced materially from the shaft 16 as indicated at 35. The chamber 33 is closed at its other end by the plate or disc member 36 which is also split diagonally and is secured together by the bolts 37 and the two halves are locked on diagonally opposite sides by the key 38. The disc 36 fits into the pocket 40 formed in the flange 29 making it flush with the same. An annular groove 41 is formed on the inner face of the disc 36 and is provided with an O-ring 42 to seal against the flange 29.

Figure 4:
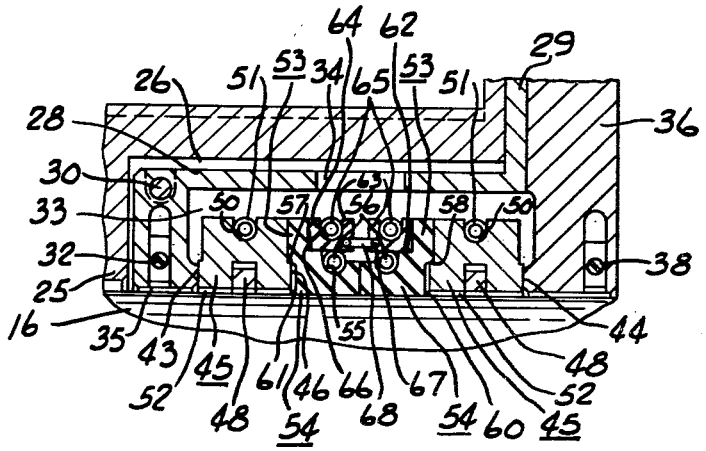
FIG. 4 is an enlarged sectional view of the seal as shown in FIG. 1.

The inner face of the housing section 28 and disc 36 have opposing annular sealing faces 43 and 44. These sealing faces are engaged by the split annular metal ring members 45 which are duplicates and are provided with the cooperating sealing faces 46 on each side thereof, only one sealing face being employed at any one time. The preferable structure as shown in FIGS. 1 and 4 provides a shoulder 47 immediately above the sealing face 46. This shoulder reduces the face 46 as only a part of the end surface of the anti-friction seal ring 45 is in engagement in place of the hole in the side thereof making the same easier to lap into a smooth and uniform sealing surface. The sealing rings 45 may be provided with electrostatic brushes as indicated at 48 to insure their proper alignment. However the radial split on the axial plane is finished so as to provide a tight surface. The outer perimetral surface of the sealing rings 45 is provided with the groove 50 to receive the garter springs 51 and hold them in assembled relation around the shaft 16. It will be noted that the bore 52 of these rings is larger in diameter than the shaft 16 and the rings do not engage the shaft although there is no relative movement between these sealing rings and the shaft.

The elastomer members 53 shown in FIGS. 1 and 4 comprise a solid body member 54 having an upwardly open groove 55 to receive the garter spring 56 to hold this ring in sealed relation on the shaft 16. This ring is not split diametrically but is split at least on one radial plane and the ends are mated with each other so as to provide a continuous ring when the garter spring 56 is positioned thereon.

The body sections of each of the elastomer members 54 have an upwardly extending flange 57 which is offset to form the shoulder 58 that overlies and engages the shoulder 47 on the adjacent ring 45. Owing to the fact that the shoulder 58 on the elastomer 54 is slightly larger in width than the shoulder 47, a clearance such as indicated at 60 and 61 is provided between the body of the elastomer and the ring 46 which clearance may momentarily be taken up by the shifting of the shaft or the application of exceedingly high pressure on the sea water passing through the tail bearing and is effective in the chambers 15 and 17 as well as in the chambers 26 and 33. A shoulder 62 is provided on the inside of the flange 57 to receive the split metal rings 63 that have an outwardly extending groove 64 to receive the garter spring 65 to hold it on the shoulder 62. The ring 63 engages not only the shoulder 62 but also the inner face of the flange 57. The ends of the rings 63 are flat radial surfaces adjacent its periphery but the remainder of the sides taper towards the bore of the ring as indicated at 66. The rings 63 have adjacent annular slots 67 for receiving the continuous expanding spring 68 which is in the form of a sine wave and forces the metal rings 63 away from each other thereby pressing their respective flanges 57 against their respective sealing rings 45.

The pressure exerted by the flanges 57 against their respective sealing rings 45 is thus augmented by the pressure of the expanding spring 68 to maintain sealing faces 46 in contact with their cooperative sealing faces 43 and 44. The sealing face 43 having the same fluid pressure on both sides thereof does not actually function as a seal but merely as a reaction surface in maintaining sealing pressure between the sealing faces 44 and 46. The elastomer members 53 being sealed with and tightly clamping on the shaft 16 will rotate with the shaft and thus drive the sealing rings 45 with the shaft. Since the sealing ring adjacent the chamber 17 is out of engagement with the shaft the liquid under pressure from the sea is effective in the clearance 61 which in combination with the fluid pressure on the inside of the flanges is effective in forcing the sealing ring 45 against the sealing surface 44 due to the fluid pressure as well as due to the expanding spring member 68. In view of the fact that the body of the elastomer 54 is solid and only the slight clearance 60 and 61 must be taken up to move it, there is very little if no movement of the seal member when it is subjected to high fluid pressures such as created upon the explosion of a mine or depth charge and since there is no axial movement of the ring 45 bearing against the sealing surface 44, there is no rupture or change in the effect of a seal and it functions through varied pressures without interruption.

Figure 3:
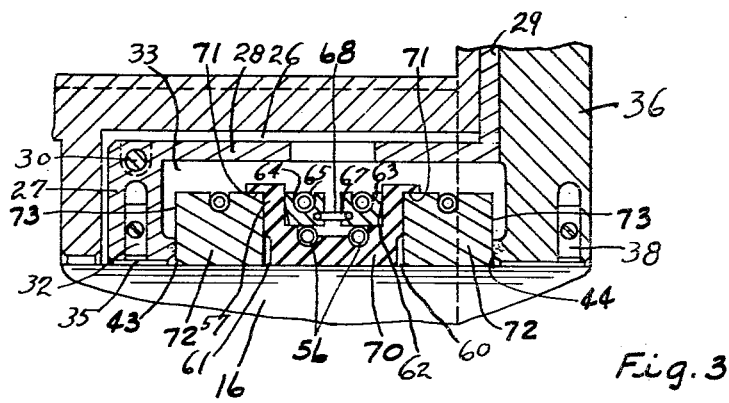
FIG. 3 is a sectional view of a modified form of this elastomer member making up this seal.

The structure shown in FIG. 3 is similar to the structure shown in FIG. 1 with the exception that the elastomer member 70 is made in one piece. However it is of similar construction to that shown in FIG. 1 but a shoulder 71 is provided on the perimeter of each of the flanges for locking over the perimeter of the split ring members 72 to hold them in position. The whole of the face of the ring member 72 is a sealing surface as indicated at 72 and which functions to coact with the sealing faces 43 and 44.

The shoulders 58 and 71 on the elastomer members 53 and 70 respectively thus retain the concentric position of the sealing rings 45 and 72 relative to the shaft.

Although the elastomer member 70 is one piece, it is of course split radially and requires the garter springs 56 to hold them in position. The flanges of the elastomer 70 are constructed so as to provide an initial pressure against the split sealing ring 72 when assembled. However it is preferable to add the pressure spring 68 as described with reference to the structure shown in FIG. 1.

I claim:

1. A ship's propeller shaft seal to resist sudden high pressure consisting of a metal housing sealed with the hull of a ship and surrounding the propeller shaft to provide an annular chamber therewith, a radial wall at both ends of said chamber, an annular sealing face on each of said radial end walls, a pair of nondeformable sealing rings each having a radially disposed annular abutment surface on one end and an annular sealing face on the other end to cooperate with the sealing faces on the end walls of said chamber, an annular elastomer means having solid body section means sealing on said shaft between said sealing rings, radially disposed striking abutment surfaces at the ends of said solid body section means to engage said radially disposed annular abutment surfaces on said one end of said sealing rings, and outwardly projecting deformable flange means outwardly beyond said radially disposed abutment surfaces at the ends of said solid body section means having continuous sealing engagement on said one end of said sealing rings to force said cooperating annular sealing faces in sealing engagement with each other and hold said radially disposed striking abutment surfaces free from engagement with said sealing rings to form a clearance between said sealing rings and said radially disposed abutment surfaces on said solid body section means, said flanges flexing to permit said radially disposed abutment surfaces to engage each other along their respective coextensive radially disposed surfaces when the seal parts shift on said shaft.

2. A ship's propeller shaft seal for resisting sudden high pressures consisting of, a metal housing sealed with the hull of a ship and surrounding the shaft with clearance to admit sea water and to provide an annular chamber therewith, a radial wall at each end of said chamber, an annular sealing face on each of said radial end walls, a pair of nondeformable sealing rings each having a radially disposed annular abutment surface on one end and an annular sealing face on the other end to cooperate with said sealing faces on the end walls of said chamber, an annular elastomer means gripping and sealing on said shaft between said sealing rings, solid body section means on said elastomer means, radially disposed striking abutment surfaces at the ends of said solid body section means to engage said radially disposed annular abutment surfaces on said one end of said sealing rings, outwardly projecting deformable flange means integral with said elastomer means and extending outwardly and beyond said radially disposed abutment surfaces at the ends of said solid body section means to continuously engage and seal on each of said one end of said sealing rings and hold said radially disposed striking abutment surfaces free from engagement with said sealing rings to form a clearance between said sealing rings and their corresponding radially disposed striking abutment surfaces on said solid body section means while said flange means maintains said cooperative annular sealing faces in contact, and an expansion means effective on said flange means to maintain pressure between said cooperating annular sealing faces, said deformable flange means flexing under sea water pressure subjected to the shaft seal to collapse the same and permit the corresponding radially disposed striking abutment surfaces on said solid body section means and on said sealing rings to engage each other and prevent dislodgment of the shaft seal.

3. The seal of claim 2 characterized by an annular ring seated inwardly of each of said flange means and between said flange means and said expansion means.

4. The seal of claim 2 characterized in that said solid body section means is solid elastomer material that extends from adjacent one radially disposed abutment face to the other.

5. The seal of claim 2 characterized in that said sealing rings have a bore larger than the dimension of said shaft, a cylindrical surface on each sealing ring, and a mating shoulder on said flange means to engage said cylindrical surface and to locate the axes of said sealing rings relative to said shaft.

6. The seal of claim 2 characterized by means defining a passage to admit the pressure of the sea water to the interior of said annular chamber and along said propeller shaft to both sides of one of said sealing rings.

7. A ship's propeller shaft seal to resist sudden high pressure consisting of a metal housing sealed with the hull of a ship and surrounding the propeller shaft to provide an annular chamber therewith, a radial wall at both ends of said chamber, an annular sealing face on each of said radial end walls, a pair of metal rings each having an annular sealing face to cooperate with the sealing faces on the end walls of said chamber, an annular elastomer means having solid body section means sealing on said shaft between said metal rings, coextensive striking abutment surfaces at the ends of said solid body section means to engage said metal rings, outwardly projecting deformable flange means outwardly beyond said abutment surfaces at the ends of said solid body section means having continuous sealing engagement on said metal rings to force said cooperating sealing faces in sealing engagement with each other and hold said coextensive striking abutment surfaces free from engagement with said metal rings to form a clearance between said metal rings and said coextensive abutment surface on said solid body section means, said flanges flexing to permit said coextensive abutment surfaces to engage said metal rings when the seal parts shift on said shaft, and a shoulder on each of said flanges that engages over the adjacent metal ring to maintain its radial stability and said clearance.

8. The structure of claim 7 characterized in that each of said metal rings has a shoulder to receive the shoulder of said flanges, the shoulder of said metal rings is smaller than the shoulder of said flanges to maintain said small clearance.

9. The structure of claim 7 characterized in that said metal rings have a bore greater in diameter than said propeller shaft.

10. A ship's propeller shaft seal to resist sudden high pressure comprising a metal housing sealed with the hull of the ship and surrounding the propeller shaft to provide an annular chamber therewith, a radial wall at both ends of said chamber, an annular sealing face on each of said radial end walls, a pair of metal sealing rings each having an annular sealing face to cooperate with the sealing faces on the end walls of said chamber, annular elastomer means having solid body section means sealing on said shaft between said metal sealing rings, outwardly projecting flange means at the ends of said solid body section means to engage and force said cooperating sealing faces in sealing engagement with each other and to form a small clearance between said metal sealing rings and said solid body section means, said elastomer is made in two parts, and an annular expansion member forcing said flanges outwardly and consisting of opposed annular rings having opposed annular grooves and a continuous sine wave expanding spring in said groove to force said flanges into engagement with said metal sealing rings and thus maintain said sealing faces in contact.

11. A ship's propeller shaft seal to resist sudden high pressure consisting of a metal housing sealed with the hull of a ship and surrounding the propeller shaft to provide an annular chamber therewith, a radial wall at both ends of said chamber, an annular sealing face on each of said radial end walls, a pair of metal sealing rings each having an annular sealing face to cooperate with the sealing faces on the end walls of said chamber, an annular elastomer means having solid body section means sealing on said shaft between said metal sealing rings, coextensive striking abutment surfaces at the ends of said solid body section means to engage said metal sealing rings, outwardly projecting deformable flange means outwardly beyond said abutment surfaces at the ends of said solid body section means having continuous sealing engagement on said metal sealing rings to force said cooperating sealing faces in sealing engagement with each other and hold said coextensive striking abutment surfaces free from engagement with said metal sealing rings to form a clearance between said metal sealing rings and said coextensive abutment surfaces on said solid body section means, said flange flexing to permit said coextensive abutment surfaces to engage said metal sealing rings when the seal parts shift on said shaft, and a passage in said housing from said shaft to said chamber provides the pressure of the sea exposed to the flanges of said annular elastomer means.

References Cited in the file of this patent

UNITED STATES PATENTS

| | | |
|---|---|---|
| 1,499,583 | Leroy | July 1, 1924 |
| 2,383,667 | Matter | Aug. 28, 1945 |
| 2,426,047 | Payne | Aug. 19, 1947 |
| 2,472,264 | Payne | June 7, 1949 |
| 2,853,020 | Hollinger et al. | Sept. 23, 1958 |

FOREIGN PATENTS

| | | |
|---|---|---|
| 487,897 | Great Britain | June 28, 1938 |